United States Patent [19]

Harris et al.

[11] Patent Number: 5,335,873
[45] Date of Patent: Aug. 9, 1994

[54] CASSETTE FOR WEB MATERIAL

[75] Inventors: Clark E. Harris, Fairport; Raymond D. Hulbert, Penfield; Andrew E. Dominesey; Thomas C. Healey, both of Rochester; Joel R. Shaw, Fairport, all of N.Y.

[73] Assignee: Eastman Kodak Company, Rochester, N.Y.

[21] Appl. No.: 955,185

[22] Filed: Oct. 1, 1992

[51] Int. Cl.$^5$ ............................. G03B 1/04
[52] U.S. Cl. ........................ 242/348; 242/601; 242/608.6
[58] Field of Search ............ 242/71, 71.1, 71.8, 242/71.7, 71.9, 74, 55.53; 354/275, 277; 206/407, 409, 316

[56] References Cited

U.S. PATENT DOCUMENTS

| | | | |
|---|---|---|---|
| 3,831,881 | 8/1974 | Tucker | 242/194 |
| 4,033,523 | 7/1977 | Roman | 242/198 |
| 4,338,015 | 7/1982 | Holmes | 354/275 |
| 4,398,814 | 8/1983 | Muylle et al. | 242/71.1 X |
| 4,597,658 | 7/1986 | Buelens et al. | 242/71.1 X |
| 4,732,271 | 3/1988 | Solyntjes | 242/71.7 |
| 4,756,418 | 7/1988 | Johanson et al. | 354/275 |
| 4,802,633 | 2/1989 | Beery | 242/71.1 |
| 4,830,305 | 5/1989 | Güggi et al. | 242/71.7 |
| 4,834,236 | 5/1989 | Buelens et al. | 242/71.1 |
| 4,903,833 | 2/1990 | Beery | 206/407 |
| 5,156,354 | 10/1992 | Robertson et al. | 242/71.1 |

Primary Examiner—Daniel P. Stodola
Assistant Examiner—Eileen A. Dunn
Attorney, Agent, or Firm—Clyde E. Bailey

[57] ABSTRACT

A cassette (10) has a tubular web core (12) onto which is wound a web (14) of photosensitive material to form a web roll. The web roll is housed within a substantially rectangular jacket (16) which has an exit slot (20) extending substantially from one side edge of the jacket (16) through which the web (14) may be drawn from the cassette (10). Moreover, cassette (10) comprises a pair of end caps (22) having tubular hub members (25) insertable into opposite ends of tubular core opening (39) defined by sleeve portion (38) of tubular web core (12) for rotatably supporting tubular web core (12). In the preferred embodiment, each hub member (25) has at least one flexible lock (44) at the free end thereof such that when the flexible lock (44) rotatably engages core grooves (36), separation of the end caps (22) from the jacket (16) is prevented. Moreover, a substantially flat, H-shaped fork (42), having at least one flexible camming ramp (40) on one end and graspable pinch fingers (46) exposed through the hub member (25) on the opposite end is mounted within at least one of the hub members (25) to prevent rotation of the web core (12).

9 Claims, 6 Drawing Sheets

CASSETTE FOR WEB MATERIAL

FIELD OF THE INVENTION

The present invention relates generally to web cassettes, and more particularly to light-tight web cassettes for holding and dispensing a roll of web material.

BACKGROUND OF THE INVENTION

It is generally known in the art to provide a web cassette for holding and dispensing a roll of unexposed light-sensitive web material for use in phototypesetting apparatus, in semi-automatic process cameras, for instance, for handling diffusion transfer material in a daylight environment, etc. in such web cassettes, the end caps have peripheral slots for receiving side edges of the cassette jacket, and are secured in light-tight relation to the side edges by adhesive and/or staples.

Accordingly, a shortcoming of the prior art web cassettes is that the assembly steps of applying the adhesive to the side edges of the jacket and stapling together the mating edges of the end caps and jacket side edges add to the cost of manufacturing the web cassettes.

One prior art attempt to solve these problems includes U.S. Pat. No. 4,903,833 which teaches a cartridge for light sensitive web-type material having inwardly extending annular rings in the housing ends which terminate in close running relation to the adjacent outside surface of a spool end flange to support the media material and to prevent telescoping in the event the cartridge or cassette is mishandled or dropped. While the cartridge therein disclosed may have sufficed for its intended purpose, it does not fulfil the present need set forth hereinabove.

Therefore, a need exists for a web cassette having an anti-clockspringing device that is light tight, easy to assemble and, thus, economical to manufacture.

SUMMARY OF THE INVENTION

It is, therefore, an object of the present invention to provide an improved light-tight web cassette for holding and dispensing a roll of photosensitive web material. Accordingly, for accomplishing these and other objects of the invention, there is provided a cassette for a web material comprising:

a tubular web core rotatable about an axis, the web core having a sleeve portion defining a core opening, and at least one circumferential core groove inside the sleeve portion near each end;

a pair of end caps each having hub members insertable into opposite ends of the core opening for rotatably supporting the web core, each hub member having at least one radially extending flexible lock at the free end thereof;

a jacket encircling the web core and engagably supported by the end caps, the flexible lock when rotatably engaged with the core grooves preventing the end caps from separating away from the jacket;

anti-clockspringing means on the cassette for securing the web core against rotation within the cassette during shipping and handling, and for releasing the web core #or rotation during web transport from the cassette, the anti-clockspringing means comprising:

at least one fork slidably mounted within at least one of the hub members, the fork being graspably exposed through an opening in the end cap and including at least one flexible camming ramp at the opposite end, the fork being movable between a core-braked position in which the camming ramp engages and forces the flexible lock into braking engagement with the core groove for preventing rotation of the web core, and a core-released position in which the camming ramp is disengaged from the core groove for allowing web core rotation.

BRIEF DESCRIPTION OF THE DRAWINGS

The foregoing as well as other objects, features and advantages of this invention will become more apparent from the appended figures wherein like reference numerals denote like elements, and wherein.

DETAILED DESCRIPTION OF THE INVENTION

Figure 1:
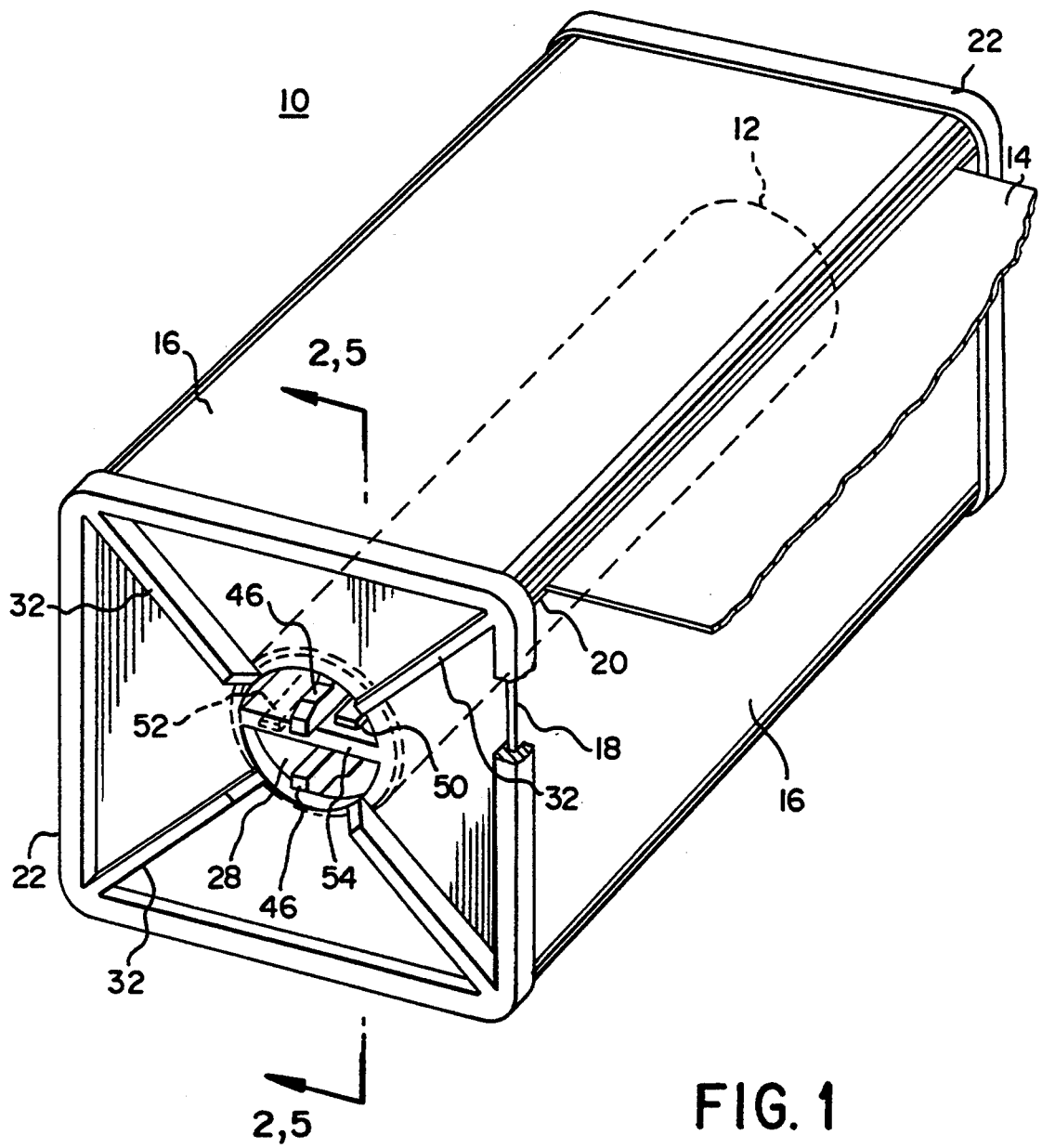
FIG. 1 is a perspective view of a preferred embodiment of a web cassette according to the present invention.
Figure 2:
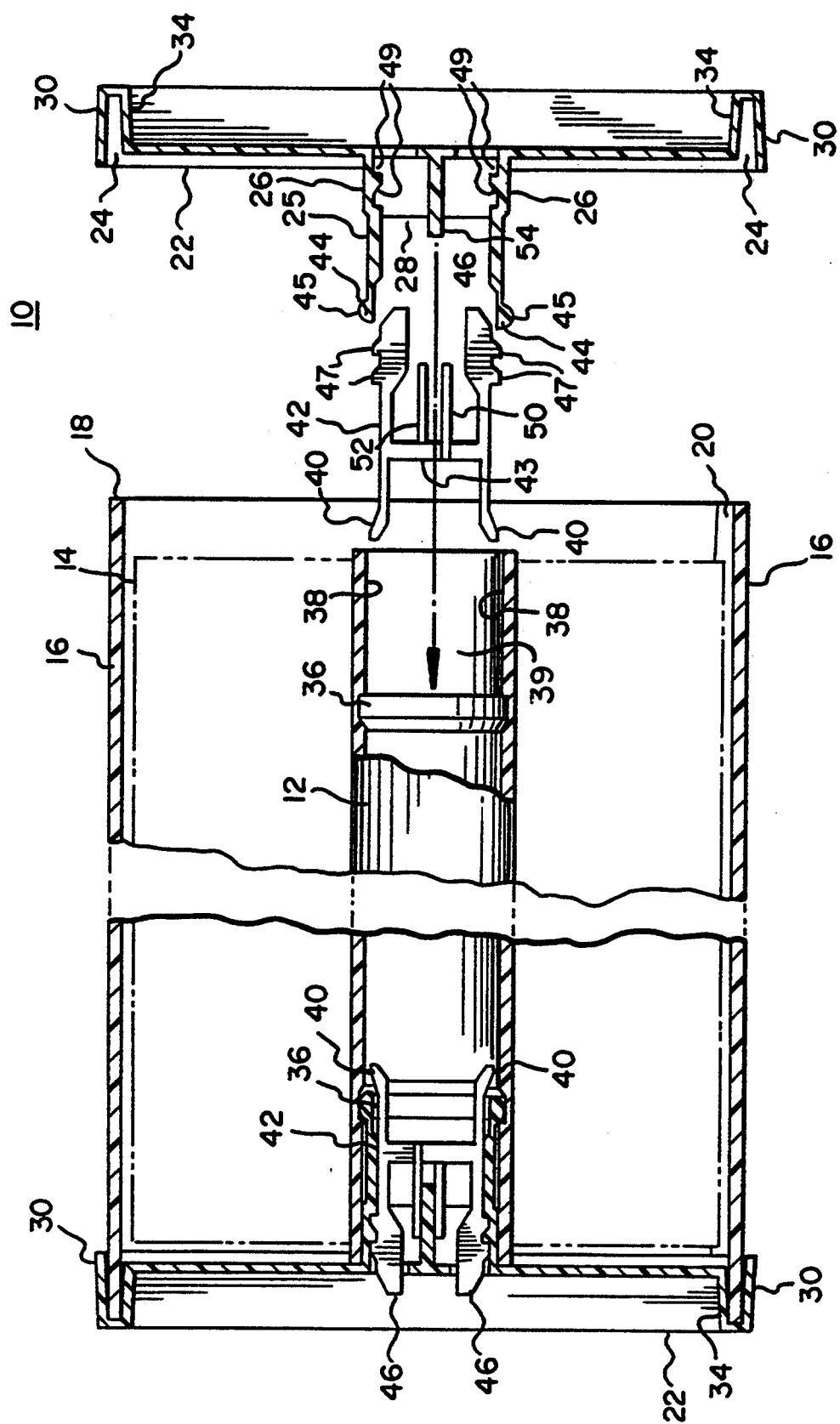
FIG. 2 is a sectional view, partially exploded of a preferred embodiment of the present invention.

With reference to FIGS. 1 & 2, a preferred embodiment of the web cassette 10 of this invention comprises a substantially tubular web core 12, onto which is wound a web 14 of photosensitive material to form a web roll. The web roll is housed within a substantially rectangularly shaped jacket 16 having side edges 18. The jacket 16 has a peripheral web exit slot 20 extending substantially from one side edge thereof to the other, through which the web 14 may be drawn from web cassette 10.

Figure 3:
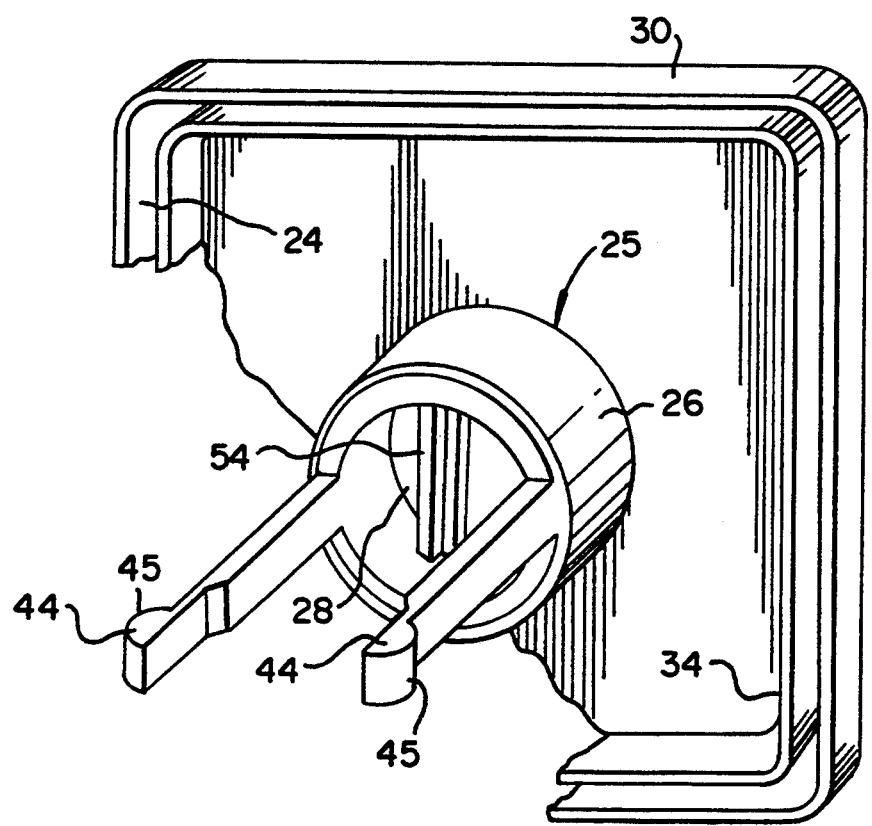
FIG. 3 is a perspective view, partially broken away, of the end cap of the invention.
Figure 4:
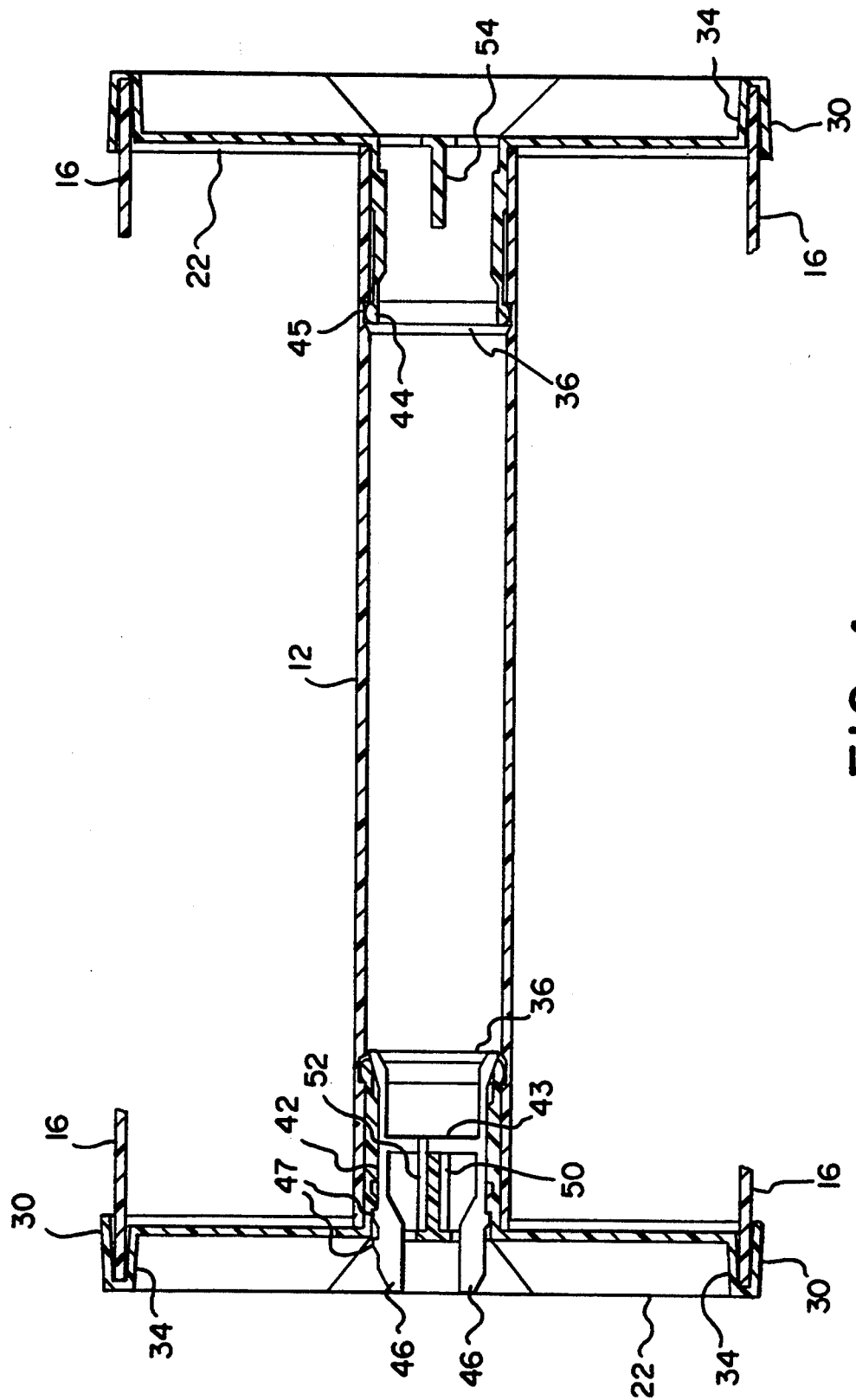
FIG. 4 is a sectional view of the anti-clockspringing means of the invention in its locked position for shipping taken along line 2—2 line of FIG. 1.

Web cassette 10 is provided with a pair of identical end caps 22, each having a peripheral recess 24 for receiving a side edge 18 of jacket 16, as best seen in FIGS. 2 and 3. End caps 22 comprise a tubular hub member 25 having an outer cylindrical wall 26 defining a center opening 28, and a peripheral bifurcated outer wall 30 defining the recess 24, as best seen in FIG. 3. A plurality of strengthening ribs 32 (FIG. 1) radially extends from the inner wall 34 (FIG. 2) of end caps 22 to the outer wall 30 of end caps 22.

A single tubular web core 12, preferably plastic, supports the spooled web roll, and has internal core grooves 36 (FIGS. 2,4, 5 & 6) located substantially near each end of web core 12 for securing end caps 22 onto side edges 18 of jacket 16. Each end of web core 12 has a sleeve portion 38 defining a core opening 39 which engages the outer cylindrical wall 26 of hub member 25 of end caps 22 (FIG. 2). The sleeve portion 38 acts as a light lock and a bearing surface during web roll rotation while in contact with cylindrical wall 26 of hub member 25.

Figure 5:
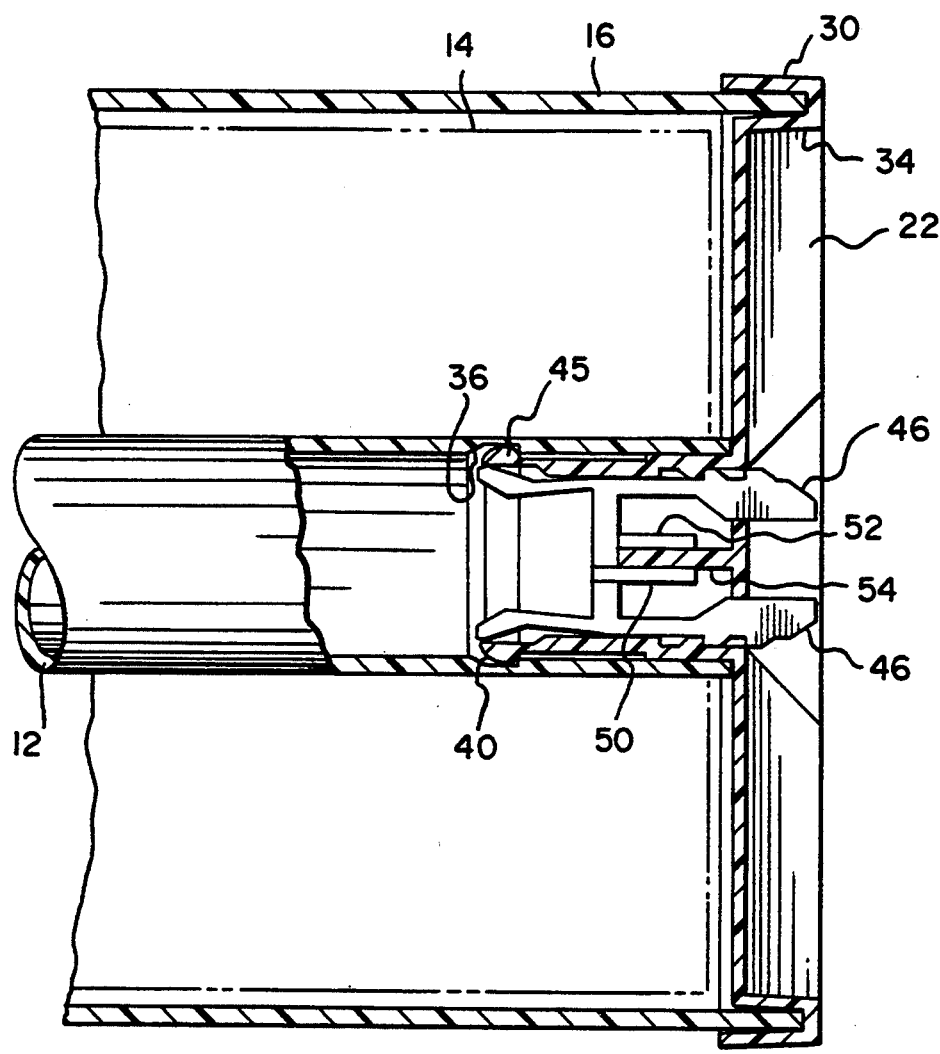
FIG. 5 is a partial section view along line 5—5 of FIG. 1 showing the fork fully engaged in the core locked position.
Figure 7:
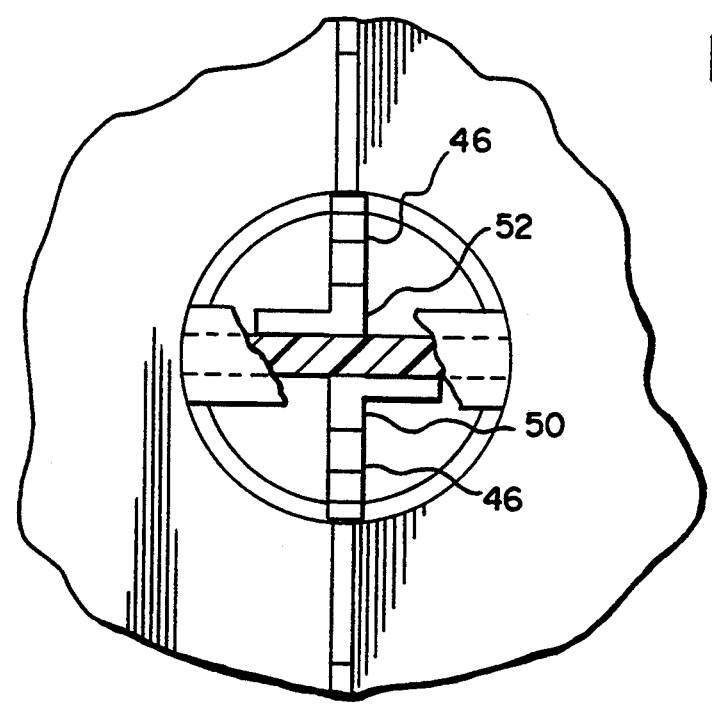
Figure 6:
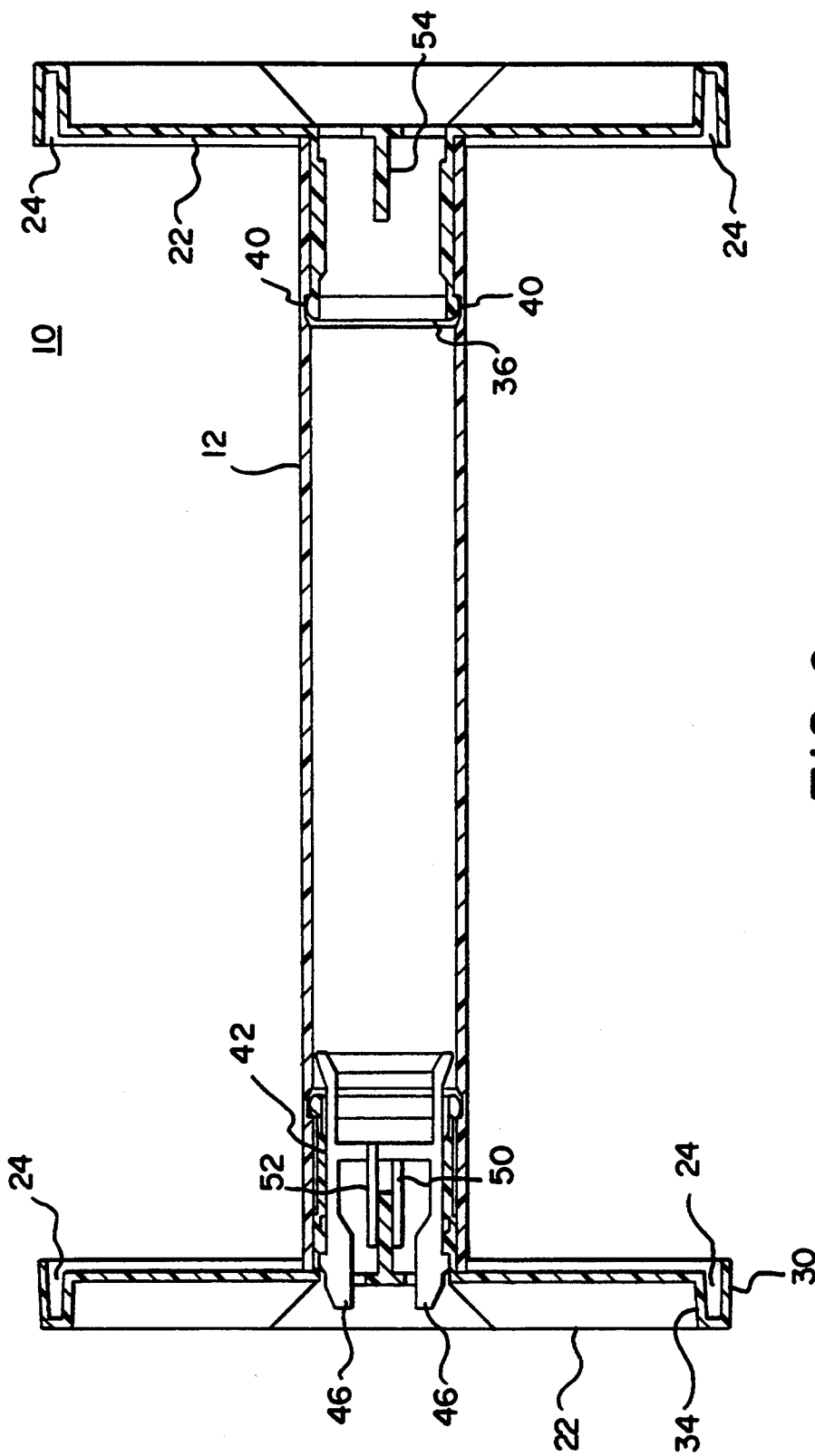
FIG. 6 is a sectional view of the anti-clockspringing means of the invention in its unlocked position; and, FIG. 7 shows a fragmentary elevation view, partially broken away, of the end cap of the invention.

While there are numerous ways to prevent the rotation of end caps 22 relative to web core 12, in the preferred embodiment, a flat substantially H-shaped fork 42 is preferred, having a central member 43, a pair of spaced-apart flexible pinch fingers 46 each extending from one end of the central member 43 and a pair of flexible camming ramps 40 extending from the opposite end of the central member 43 is preferred. A pair of flexible, axially extending locking fingers or locks 44 are provided at diametrically opposite locations on the free end of each hub member 25, each lock 44 including a radially outwardly extending pad 45 at its free end. Flexible camming ramps 40 on fork 42 will press pads 45 radially outward into locking engagement with core grooves 36, as shown in FIG. 5, to prevent rotation of web core 12. When fork 42 is pushed inward, fork 42 slides axially toward the center of web core 12 disappearing into the center opening 28 of the end cap 22 with outer pads 45 of hub member 25 slidably nesting within core grooves 36. Therefore, it should be appreciated that fork 42 is slidably movable between a core-brake position (FIGS. 4 and 5) in which camming ramps 40 on fork 42 engage flexible locks 44 and force outer pads 45 into braking engagement with core groove 36 for preventing rotation of web core 12; and, a core-released position (FIG. 4) in which outer pads 45 are disengaged from core grooves 36 of web core 12. When pinch fingers 46 are compressed toward each other, they disengage from notches 49 on pinch fingers and, fork 42 slidably disengages the camming ramps 40 from flexible locks 44.

Detent means interposed between pinch fingers 46 and hub member 25 releasably hold fork 42 in at least the core-braked position, as best seen in FIGS. 2 and 5. While those skilled in the art will appreciate that any detent means within the definition of the invention may be used, the preferred detent means comprises axially spaced lugs 47 (FIG. 2) on one of the pinch fingers 46 and hub member 25 and a pair of cooperating axially spaced notches 49 on the other pinch finger 46 and hub member 25.

Stabilizing means defined by spaced, radially extended blades 50 and 52 of fork 42 engage with diametral rib 54 in the center opening 28 of the end caps 22 to prevent fork 42 from rotation relative to end caps 22, thus counter acting the force of the clockspringing by the web roll and thereby stabilizing fork 42 within the end cap hub member 25.

Accordingly, an important advantage of the light tight web cassette having an anti-clockspringing device of the present invention is that it can be easily assembled without having to staple together the mating edges of the end caps and jacket side edges, thereby resulting in reduced cost of manufacturing.

The invention has been described in detail with particular reference to a preferred embodiment thereof, but it will be understood that variations and modifications can be effected within the scope of the invention.

What we claim is:

1. A cassette for a web material comprising:
   a web core rotatable about an axis, said web core having a sleeve portion defining a core opening, and at least one circumferential core groove inside said sleeve portion near each opposite end of said core opening;
   a pair of end caps each having a hub member insertable into said opposite ends of said core opening for rotatably supporting said web core, each hub member having a free end and at least one radially extending flexible lock at said free end;
   a jacket encircling said web core and engagably supported by said end caps, said flexible lock when rotatably engaged with said core groove preventing said end caps from separating away from said jacket;
   anti-clockspringing means on said cassette for securing said web core against rotation during web transport from said cassette, said anti-clockspringing means comprising:
   at least one fork slidably mounted within at least one of said hub members, said fork at one end being exposed through said hub member and including at least one flexible camming ramp at the opposite end, said fork being movable between a core-braked position in which said camming ramp engages and forces said flexible lock into braking engagement with said core groove for preventing rotation of said web core, and a core-released position in which said camming ramp is disengaged from said core groove for allowing web core rotation.

2. A cassette recited in claim 1 wherein said flexible lock has an outer pad that slidably nests within said core groove to permit rotation when said hub member is fully inserted into said core opening and said camming ramp are disengaged.

3. A cassette recited in claim 2 wherein said fork comprises a flexible pinch finger, and detent means are interposed between said pinch finger and said hub member for releasably holding said fork in at least said core-braked position.

4. A cassette recited in claim 3 wherein said detent means comprises a pair of spaced-apart lugs on one of said pinch fingers and a pair of cooperating spaced-apart notches in said hub member for releasably receiving said lugs.

5. A cassette recited in claim 4 further comprising stabilizing means on each end cap and fork for rotationally stabilizing said fork within said end cap hub member.

6. A cassette recited in claim 5 wherein said hub member has a diametral rib, and wherein said stabilizing means comprises a pair of spaced-apart plates on said fork for slidably receiving said diametral rib on said hub member.

7. A cassette recited in claim 6 wherein said fork comprises a flat substantially H-shaped member having a central member, said pinch fingers extending from one side of said central member, said camming ramp extending from the opposite side of said central member.

8. A cassette recited in claim 7 wherein said hub member has a diametral rib, and wherein said stabilizing means comprises a pair of spaced-apart blades on said central men, bet for slidably receiving said diametral rib on said hub member.

9. A cassette recited in claim 2, and further comprising stabilizing means on each end cap and fork for stabilizing said fork within said end cap hub member.

* * * * *